No. 691,806. Patented Jan. 28, 1902.
O. F. PERSSON.
VEHICLE SEAT.
(Application filed Aug. 9, 1901.)
(No Model.) 2 Sheets—Sheet 1.

Witnesses:
Inventor,
Otto F. Persson,
By
Att'y.

No. 691,806. Patented Jan. 28, 1902.
O. F. PERSSON.
VEHICLE SEAT.
(Application filed Aug. 9, 1901.)
(No Model.) 2 Sheets—Sheet 2.

Witnesses: Inventor,
Otto F. Persson,
By Att'y.

THE NORRIS PETERS CO., PHOTO-LITHO., WASHINGTON, D. C.

UNITED STATES PATENT OFFICE.

OTTO F. PERSSON, OF LYNN, MASSACHUSETTS, ASSIGNOR TO ELIHU THOMSON, OF SWAMPSCOTT, MASSACHUSETTS.

VEHICLE-SEAT.

SPECIFICATION forming part of Letters Patent No. 691,806, dated January 28, 1902.

Application filed August 9, 1901. Serial No. 71,521. (No model.)

*To all whom it may concern:*

Be it known that I, OTTO F. PERSSON, a citizen of the United States, residing at Lynn, in the county of Essex and State of Massachusetts, have invented certain new and useful Improvements in Vehicle-Seats, (Case No. 2,311,) of which the following is a specification.

Automobiles as ordinarily constructed for pleasure purposes are provided with either one or two permanent seats. Such vehicles are satisfactory in most instances. It frequently happens, however, that it is desirable to carry three or more persons when only one seat is provided, and with automobiles as ordinarily constructed the controlling and steering mechanism interfere with the seating of three persons. On the other hand, it frequently happens that a single person desires to use a two-seated vehicle and the presence of the empty seat is objectionable.

The object of my invention is to provide a vehicle which can readily be converted from a single into a two seated conveyance, or vice versa.

The nature of my invention will be more fully set forth in the description and its scope in the claims appended thereto.

Figure 1:
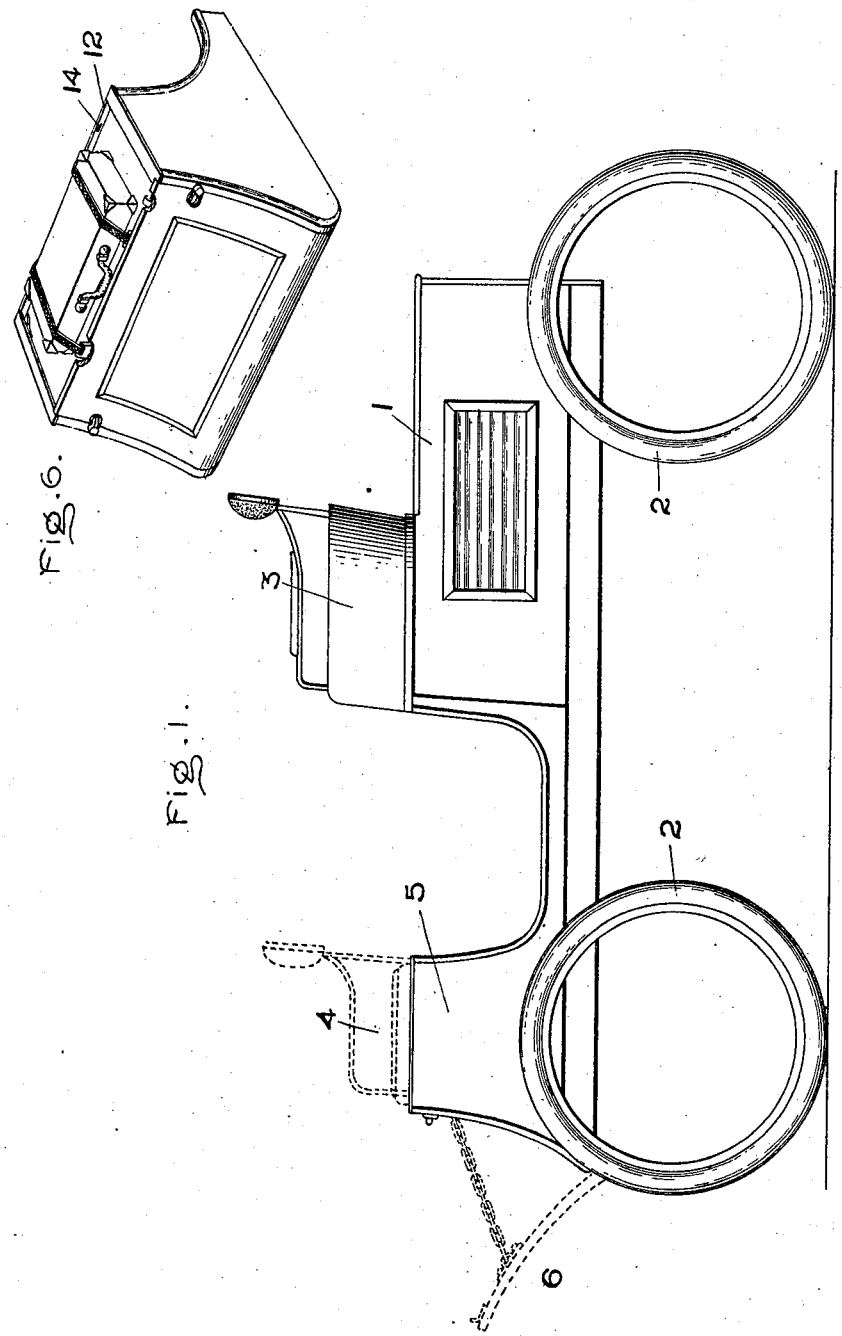
Figure 2:
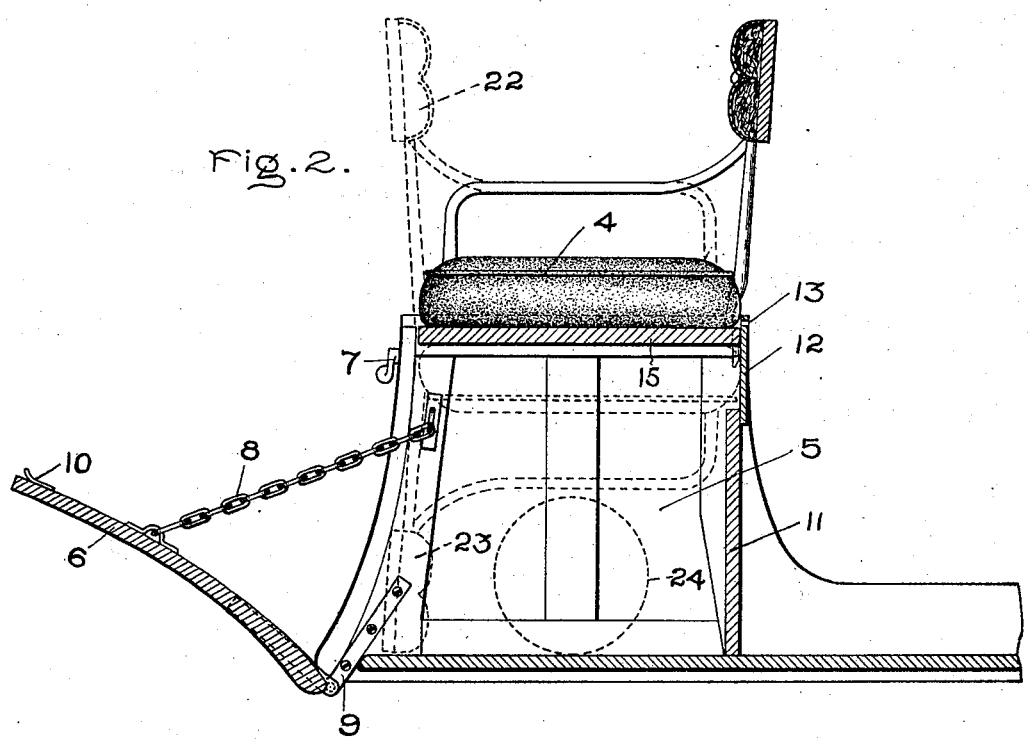
Figure 3:
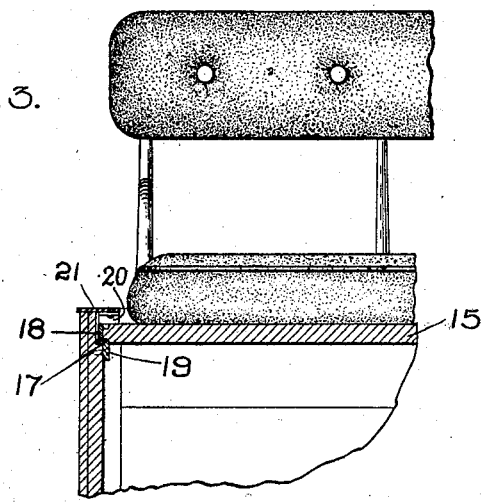
Figure 5:
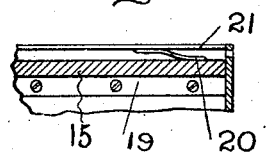
Figure 4:
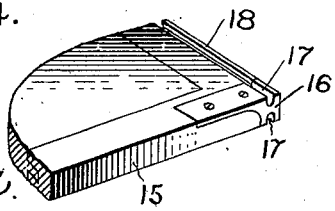

In the accompanying drawings, which illustrate an embodiment of my invention, Figure 1 is a side elevation of the vehicle. Fig. 2 is a detail view, partially in section, of the seat. Fig. 3 is a vertical sectional detail showing one of the guides. Fig. 4 is a perspective of one corner of the seat. Fig. 5 is an enlarged detail view, and Fig. 6 is a perspective view illustrating the seat inverted and supporting baggage.

1 represents the vehicle-body, which is mounted on wheels 2 in any convenient manner. For simplicity of illustration the driving mechanism has been omitted.

3 represents the permanent seat of the vehicle, and 4 the movable auxiliary seat.

The front of the vehicle is provided with a raised portion 5, which may or may not include some of the working parts of the apparatus—such, for example, as the fuel-tank. In Fig. 2 I have illustrated the fuel-tank 24 within the box-like inclosure 5, which inclosure supports the auxiliary seat. The front end of the inclosure may be dropped down, as illustrated in dotted lines, Fig. 1, and in full lines, Fig. 2, to form a footboard. This footboard is retained in place in its normal or raised position by tail-board clamps 7 of any suitable construction and when in the lowered position by the side chains 8. The footboard is secured at its lower end to the body of the vehicle by hinges 9. The upper end of the footboard is provided with a pair of small clips 10, situated on opposite sides of the board and arranged to engage with the seat and hold it in place when in its raised or normal position. Extending transversely across the vehicle and occupying a vertical plane is a board 11, which closes the rear end of the box-like structure 5. Situated above this board and extending across the vehicle is a flat metal plate 12, which is provided with slots 13, as illustrated in Fig. 2, through which straps may be passed to hold luggage in position on the seat when the latter is inverted. In addition to the slots 13 other slots 14 are provided, to which a rain-curtain may be secured.

The seat proper consists of a rectangular base-board 15, which is provided with metal corner-pieces 16, grooved at the top and bottom, as indicated at 17. The grooves are extended across the ends of the board, which ends are reinforced by the flat metal strips 18, the latter forming a continuation of the corner-pieces 16 and also serving to form the outer wall of the groove. In order to support the seat, guides are provided, which in the present instance consist of flat metal pieces 19, which enter the lower groove 17 on the seat when the latter is in place. Situated above each guide and in line therewith is a strip of elastic material 20. This strip bridges the grooves 17 and prevents the seat from rattling when unoccupied. The strips are secured to flat metal plates 21, that are secured to the sides of the carriage by screws. The guides on both sides of the vehicle correspond, and the construction of both ends of the seat being similar it follows, therefore, that the seat can be mounted on the box-like structure 5, either in the position illustrated in full lines, Fig. 2, or in the dotted-line position 22. The groove 17 in the seat being similar, top and bottom, it also follows that the seat-board can be inverted and slipped into the guides in such position that it assumes the dotted-line position indicated at 23. In other words, the seat is inclosed within the box-like compartment 5 and a smooth surface is presented, as is indicated in Fig. 6, for the reception of baggage or bundles. When the seat is in the position shown in full lines, Fig. 2, its backward movement is limited by the flat plate 12, and the tendency of the seat to work forward is prevented by the occupant. If the seat is unoccupied, the elastic strip 20, engaging with the upper guide, will serve the same purpose and also prevent the parts from rattling. With the seat in the dotted-line position 22 the footboard 6 would be in the raised position and the base-board would be clamped between the rear plate 12 and the projections 10, carried by the footboard, the latter being retained in place by the tail-board clamps 7.

In Fig. 5 I have shown, on an enlarged scale, the means employed for holding the seat in place and preventing the parts from rattling. The guide 19 is fastened to its support by screws, and the flat metal spring 20 is riveted to the top plate 21. The base-board of the seat is held between the springs and the guide, which also prevents the parts from rattling.

The particular character of the construction of the seat is immaterial so long as it can be inverted and slipped within the box-like inclosure 5. The cushion can be secured to the seat in any well-known manner.

What I claim as new, and desire to secure by Letters Patent of the United States, is—

1. In a vehicle, the combination of a detachable seat, grooves formed in the ends thereof, supports entering the grooves whereby the seat may be mounted to face the front or rear or be inverted, and elastic means for preventing the seat from moving horizontally and rattling when in either of the positions mentioned.

2. In a vehicle, the combination of a detachable seat, a board having similar grooved and parallel ends, corresponding and similar supports for the board arranged to enter the grooves, which supports are situated on opposite sides of the vehicle-body so that the seat may be arranged to face the front or rear or be inverted, and springs arranged to press on the board for preventing the seat from moving horizontally when occupying either of its positions.

3. In a vehicle, the combination of a detachable seat-board having parallel ends, so that it may be reversed as to position, supports therefor, located on opposite sides of the body, a pivoted footboard, and lugs on the footboard which engage with the seat-board to hold it in position when the former is in the raised or normal position.

4. In a vehicle, the combination of a body, a detachable seat-board having parallel ends whereby it may be reversed as to position or inverted, supports for the board mounted on opposite sides of the body, a stop against which the seat abuts, a pivoted footboard, lugs carried thereby which engage with the seat, and means for holding the footboard in the raised position.

5. In a vehicle, the combination of a detachable seat-board having parallel ends, whereby it may be reversed as to position, grooved metallic corner-pieces secured thereto, metal end pieces forming continuations of the grooves, supports which fit into the grooves, and elastic means for holding the board in position.

6. In a vehicle, the combination of a detachable seat having parallel ends whereby it may be inverted as to position, a slotted plate which acts as a stop for the seat, and slotted lugs secured to the under side of the seat, and arranged to face the slotted plate when the seat is inverted, so that straps may be passed through the slots for securing baggage.

In witness whereof I have hereunto set my hand this 7th day of August, 1901.

OTTO F. PERSSON.

Witnesses:
ALEX. F. MACDONALD,
DUGALD MCK. MCKILLOP.